E. F. BROWN.
SEED CORN HANGER.
APPLICATION FILED MAR. 13, 1919.

1,314,303. Patented Aug. 26, 1919.

Inventor
E. F. Brown,
By G. Hume Talbert
Attorney

UNITED STATES PATENT OFFICE.

EDGAR F. BROWN, OF DERBY, IOWA.

SEED-CORN HANGER.

1,314,303.

Specification of Letters Patent. Patented Aug. 26, 1919.

Application filed March 13, 1919. Serial No. 282,454.

*To all whom it may concern:*

Be it known that I, EDGAR F. BROWN, a citizen of the United States of America, residing at Derby, in the county of Wayne and State of Iowa, have invented new and useful Improvements in Seed-Corn Hangers, of which the following is a specification.

The purpose of this invention is to provide a device by means of which ears of seed corn may be quickly and conveniently strung together with the groups, so that they may be readily hung up to dry. Further purpose of the invention resides in the provision of a device of this character which is simple in construction, durable and effective in operation and inexpensive to manufacture. Other and further purposes appear in the following description wherein the invention is set forth in detail.

To illustrate the invention a specific embodiment thereof is employed but to such embodiment the invention is not to be defined. Actual use and practice may show to be desirable certain changes or alterations, and the right is claimed to make any which do not deviate in scope from the subjoined claim.

Figure 1:
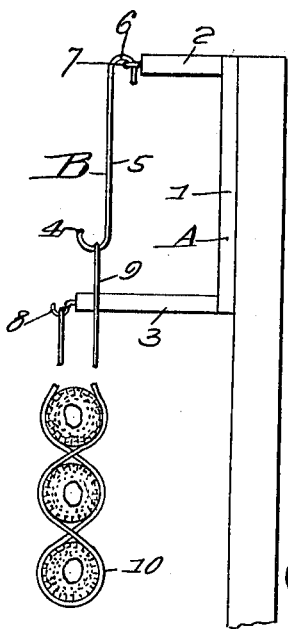
Figure 1 is a view in side elevation of the invention.
Figure 2:
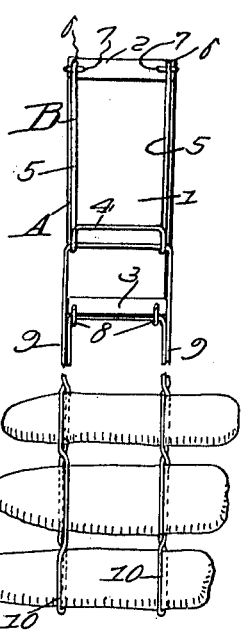
Fig. 2 is a front elevation of the view.
Figure 3:
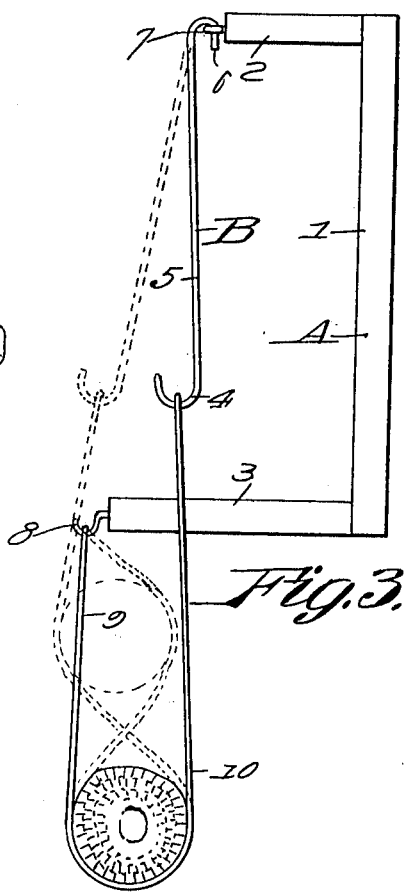
Fig. 3 is an enlarged side elevational view similar to Fig. 1, but showing the manner in which the device is applied.
Figure 4:
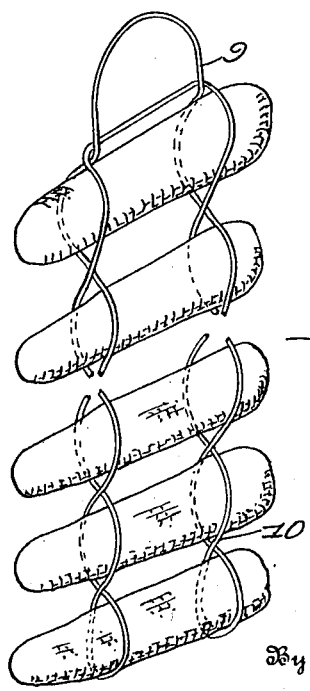
Fig. 4 is a perspective view showing a series of seed corn ears strung by the use of the improved device.

Referring to the drawings, the device is shown as comprising a frame A and a swinging member B. The former consists of an upright member 1, a top horizontal member 2, and a bottom horizontal member 3, the two latter members being fixed as at one end to the ends of the upright member 1. The upright member 1 in the use of the device is attached to a wall, post or fence where it is desired to use the invention.

The member B consists of a wire frame bent to form the hook bill 4, the legs 5 connecting with this hook bill and the hooks 6 at the terminals of the legs. This wire frame B is of less height than the upright member 1, and is designed to be carried from the outer edge of the latter in which there are attached screw eyes 7, which are engaged by the hooks 6.

The horizontal member 3 on its outer edges carries the hooks 8 and over these hooks there is looped a cord 9, the latter having its ends attached together and being also looped over the hook bill 4. In this way the cord 9 is caused to depend into two loops 10.

With the cord 9 attached as just described, an ear of corn is inserted in the two loops 10 and the wire frame B thereafter swung forward to cause the two legs of the loop to be wrapped around the ear. Thereafter a second ear is inserted between the closed legs of the loops and the frame B swung back again, thus closing the legs of the loop a second time, and providing a place for the reception of a third ear of corn. These operations are repeated until the cord 9 contains as many ears as it will hold, after which the cord is removed from the hook bill 10 and the hooks 8 and that part which had engaged the hook bill inserted through the loop which had previously engaged over the hooks 8, the ears are thus strung on the cord and the whole may then be hung in an appropriate place to dry, that part of the cord which had engaged the hook bill providing means for supporting the strung corn.

The invention having been described what is claimed as new and useful is:

A device of the character described, a frame formed with a vertical member and two horizontal members connected therewith, eyes mounted in the edge of one horizontal member, a swinging wire element formed with a loop bill and with hooks engaged in said eyes, hooks mounted on the other horizontal members of the frame, and a cord strung over the last said hooks and over the loop bill of the swinging wire element, to form two depending loops whereby the said element may be rocked for the purpose of binding together a plurality of ears of seed corn in the manner and for the useful purpose herein specified.

In testimony whereof I affix my signature.

EDGAR F. BROWN.